United States Patent
Maquire et al.

(10) Patent No.: US 9,896,123 B2
(45) Date of Patent: Feb. 20, 2018

(54) SYSTEMS AND METHODS FOR DETECTING STEERING WHEEL CONTACT

(71) Applicant: TK Holdings Inc., Auburn Hills, MI (US)

(72) Inventors: Phillip Maquire, Bloomfield Township, MI (US); Michael Groesbeck, Shelby Township, MI (US)

(73) Assignee: TK HOLDINGS INC., Auburn Hills, MI (US)

( * ) Notice: Subject to any disclaimer, the term of this patent is extended or adjusted under 35 U.S.C. 154(b) by 0 days.

(21) Appl. No.: 15/010,812

(22) Filed: Jan. 29, 2016

(65) Prior Publication Data
US 2017/0217478 A1 Aug. 3, 2017

(51) Int. Cl.
*B62D 5/04* (2006.01)
*B60Q 9/00* (2006.01)
*B62D 1/04* (2006.01)

(52) U.S. Cl.
CPC ............ *B62D 5/0463* (2013.01); *B60Q 9/00* (2013.01); *B62D 1/046* (2013.01); *B62D 5/046* (2013.01)

(58) Field of Classification Search
CPC .............................. B62D 5/0463; B60Q 9/00
USPC ................................. 701/36, 41–44
See application file for complete search history.

(56) References Cited

U.S. PATENT DOCUMENTS

| | | | |
|---|---|---|---|
| 6,876,910 B2 * | 4/2005 | Kifuku | B62D 5/0466 180/443 |
| 8,121,760 B2 | 2/2012 | Ghoneim et al. | |
| 8,190,329 B2 | 5/2012 | Kawakami et al. | |
| 8,548,667 B2 | 10/2013 | Kaufmann | |
| 8,631,896 B2 | 1/2014 | Markfort et al. | |
| 8,783,719 B2 | 7/2014 | Huber | |
| 8,818,608 B2 | 8/2014 | Cullinane et al. | |
| 8,967,320 B2 | 3/2015 | Markfort | |
| 9,096,262 B2 * | 8/2015 | Urhahne | B62D 15/00 |
| 2002/0026267 A1 * | 2/2002 | Kifuku | B62D 5/0466 701/41 |
| 2007/0198145 A1 | 8/2007 | Norris et al. | |
| 2008/0078608 A1 * | 4/2008 | Hara | B62D 15/0235 180/446 |
| 2009/0216407 A1 | 8/2009 | Cottard et al. | |
| 2011/0246028 A1 | 10/2011 | Lisseman et al. | |
| 2012/0035788 A1 | 2/2012 | Trepagnier et al. | |

(Continued)

FOREIGN PATENT DOCUMENTS

EP 1902916 B1 7/2009

OTHER PUBLICATIONS

International Search Report and Written Opinion issued in International Application No. PCT/US2017/015575, dated Apr. 17, 2017.

*Primary Examiner* — Tyler J Lee
(74) *Attorney, Agent, or Firm* — Meunier Carlin & Curfman LLC (57) ABSTRACT

Disclosed herein are systems and methods that describe systems and method for detecting operator contact with a steering wheel of a vehicle. The system can include: a steering wheel, a drive motor coupled to the steering wheel, and a drive motor controller that controls the operation of the drive motor. The drive motor controller can detect contact between the operator and the steering wheel. In one aspect, the systems and methods can be used to alert the operator of the vehicle when operator contact with the steering wheel is not detected.

41 Claims, 6 Drawing Sheets

(56) References Cited

U.S. PATENT DOCUMENTS

| | | |
|---|---|---|
| 2012/0072077 A1 | 3/2012 | Park et al. |
| 2013/0002416 A1 | 1/2013 | Gazit |
| 2013/0131906 A1 | 5/2013 | Green et al. |
| 2013/0317699 A1 | 11/2013 | Urhahne |
| 2014/0257628 A1 | 9/2014 | Lee et al. |
| 2015/0375776 A1 | 12/2015 | Hong |
| 2016/0001781 A1 | 1/2016 | Fung et al. |

\* cited by examiner

SYSTEMS AND METHODS FOR DETECTING
STEERING WHEEL CONTACT

BACKGROUND

Superposition steering systems are characterized in that a steering angle input by a driver can have a further angle superposed on it by an actuator. DE 101,313 A1 discloses a superposition gearing which is arranged between an input shaft, which is connected to the steering wheel, and an output shaft, which is connected to a steering gear. WO 2007/009420 A1 describes a superposition gearing for a superposition steering system, in which the actuator for the superposition steering system is arranged in the steering wheel. Here, the actuator is formed as a separate module.

Superposition steering systems are used for example in a so-called dynamic steering system, in which the superposition of a steering angle takes place in a speed-dependent fashion.

As more vehicles are built to include advance driving assistance systems, the vehicle may need to detect whether the driver's hands are on the steering wheel to determine if it is safe to pass control of the vehicle back to the driver. Thus, there is a need in the art for systems and methods of reliably detecting contact between the driver's hands and the steering wheel.

SUMMARY

Various implementations include a system for detecting operator contact with a steering wheel of a vehicle using an active steering system. The system can include: a steering wheel, a drive motor coupled to the steering wheel, and a drive motor controller that can control the operation of the drive motor. The drive motor controller can detect contact between the operator and the steering wheel. The drive motor controller can do so by first generating and communicating a drive signal to the drive motor to apply a force to the steering wheel. Applying a force can include applying at least one pulse of electric current. Then the drive motor controller can measure a current generated from a back electromotive force (back-EMF) on the drive motor resulting from the operator's reactions to the force applied by the drive motor. Measuring the current generated from the back-EMF can be performed periodically, for example, about one one-hundredths of a millisecond. Next, the drive motor controller can compare the current with a predefined current range. The current range can comprise a current value from and including about 1 amp to and including about 4 amps. Finally the drive motor controller can determine, from a comparison of the predefined current range and the current, whether there is contact between the operator and the steering wheel.

The drive motor can be operationally connected to one or more gears that rotate the steering wheel. The drive motor can be integrated into and formed in one piece with the steering wheel base. The drive motor can be a component of an active steering system. In addition, the drive motor can be disposed adjacent to a clockspring housing of the steering wheel.

The drive motor controller can control the operation of the drive motor by regulating power to the drive motor. The drive motor controller can associate the back-EMF on the drive motor with a current value. The drive motor controller can be a component of an active steering system.

The determination can be electronically communicated to one or more of an autonomous driving system, cruise control system, and safety system. At least one action can be taken as a result of the determination. The at least one action can include sending an alert to the operator of the vehicle. The alert can include a visual signal that is displayed to the operator. The alert can include an audio signal that is broadcast to the operator. The alert can include a vibrational signal that is mechanically imparted and receivable by the operator's body.

In some implementations, if the velocity of the vehicle is greater than a predefined velocity threshold value, the drive motor controller applies a first force to the steering wheel. If the velocity of the vehicle is less than the predefined velocity threshold value, the drive motor controller applies a second force to the steering wheel, wherein the first force is less than the second force.

And, in certain implementations, if the steering wheel is rotating with an angular velocity greater than a predefined angular velocity threshold value, the drive motor controller applies a first force to the steering wheel. And, if the steering wheel is rotating with an angular velocity less than the predefined angular velocity threshold value, the drive motor controller applies a second force to the steering wheel, wherein the first force is greater than the second force.

In various implementations, the system can use one or more of the following parameters to select the magnitude of the test force used to detect operator contact with the steering wheel and/or to provide assistive force to the operator steering: a vehicle velocity, a vehicle acceleration, an angular velocity of the steering wheel, a yaw rate of the vehicle, a toe angle of the vehicle, a camber angle of the vehicle, a caster angle of the vehicle, the angle of any one of the wheels of the vehicle, the weight of the vehicle including the weight of the passengers and/or cargo, windows/sun-roof/convertible-roof open/close status, external road environment (e.g., road surface material, road surface structural condition, presence of snow/rain/ice, road geometry (e.g., incline, number of lanes, type of lanes (e.g. passing/no-passing, approaching, turn lane)), surrounding obstacles (e.g. permanent—bridges, tunnels, buttresses, surrounding or approaching traffic (e.g. volume, proximity, relative dynamics)), and/or internal cockpit environment (e.g., driver state (e.g. identity, age, capability, health, impairment type/level, alertness), number of occupants and occupant states).

In another aspect of the disclosure, a method for detecting operator contact with a steering wheel of a vehicle is described. The method can include: generating and communicating a drive signal, by a drive motor controller, to a drive motor to apply a force to a steering wheel. The drive motor can be coupled to the steering wheel, and the drive motor controller can control the operation of the drive motor. The method can further include measuring a current generated from a back electromotive force (back-EMF) on the drive motor resulting from the operator's reactions to the force applied by the drive motor. Measuring the current can be performed periodically, for example, about one one-hundredths of a millisecond. The method can further include comparing, by the drive motor controller, the current with a predefined current range. The current range can comprise a current value from and including about 1 amp to and including about 4 amps. Finally, the method can include determining, by the drive motor controller, from a comparison of the predefined current range and the current, contact between the operator and the steering wheel.

The drive motor can be operationally connected to one or more gears that rotate the steering wheel. The drive motor can be disposed adjacent the steering wheel base. The drive motor can be a component of an active steering system. In addition, the drive motor can be disposed adjacent to a clock spring housing of the steering wheel.

The drive motor controller can control the operation of the drive motor by regulating power to the drive motor. The drive motor controller can associate the back-EMF on the drive motor with a current value. The drive motor controller can be a component of an active steering system.

The determination can be electronically communicated to another vehicle system, such as, for example, an autonomous driving system, a cruise control system, and/or a safety system. At least one action can be taken as a result of the determination. The at least one action can include sending an alert to the operator of the vehicle. The alert can include a visual signal that is displayed to the operator, an audio signal that is broadcast to the operator, and/or a vibrational signal that is mechanically imparted and receivable by the operator's body.

If the velocity of the vehicle is greater than a predefined velocity threshold value, the drive motor controller applies a first force to the steering wheel. If the velocity of the vehicle is less than the predefined velocity threshold value, the drive motor controller applies a second force to the steering wheel, wherein the first force is less than the second force.

If the steering wheel is rotating with an angular velocity greater than a predefined angular velocity threshold value, the drive motor controller applies a first force to the steering wheel. If the steering wheel is rotating with an angular velocity less than the predefined angular velocity threshold value, the drive motor controller applies a second force to the steering wheel, wherein the first force is greater than the second force.

In various implementations, the method can use one or more of the following parameters to select the magnitude of the test force used to detect operator contact with the steering wheel and/or to provide assistive force to the operator steering: a vehicle velocity, a vehicle acceleration, an angular velocity of the steering wheel, a yaw rate of the vehicle, a toe angle of the vehicle, a camber angle of the vehicle, a caster angle of the vehicle, the angle of any one of the wheels of the vehicle, the weight of the vehicle including the weight of the passengers and/or cargo, windows/sun-roof/convertible-roof open/close status, external road environment (e.g., road surface material, road surface structural condition, presence of snow/rain/ice, road geometry (e.g., incline, number of lanes, type of lanes (e.g. passing/no-passing, approaching, turn lane)), surrounding obstacles (e.g. permanent—bridges, tunnels, buttresses, surrounding or approaching traffic (e.g. volume, proximity, relative dynamics)), and/or internal cockpit environment (e.g., driver state (e.g. identity, age, capability, health, impairment type/level, alertness), number of occupants and occupant states).

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The invention is explained in more detail below with reference to the figures of the drawing on the basis of a plurality of exemplary implementations.

DETAILED DESCRIPTION

FIGS. 1 to 4 show a first exemplary implementation of a steering device having a superposition gearing which is suitable for superposing a further steering angle on a steering angle input by a driver. Here, the superposition gearing together with a drive motor forms an actuator of a superposition steering system.

Figure 1:
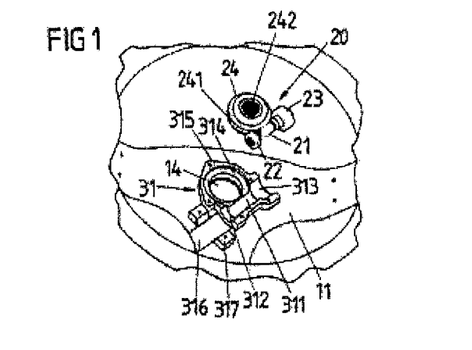
FIG. 1 shows an exploded illustration of an exemplary implementation of a steering wheel base with integrated housing constituents and gearing elements of a superposition gearing.
Figure 2A:
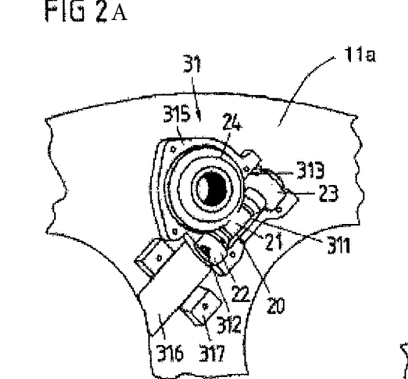
FIG. 2A shows the arrangement from FIG. 1 with gearing elements inserted into the steering wheel base.
Figure 2B:
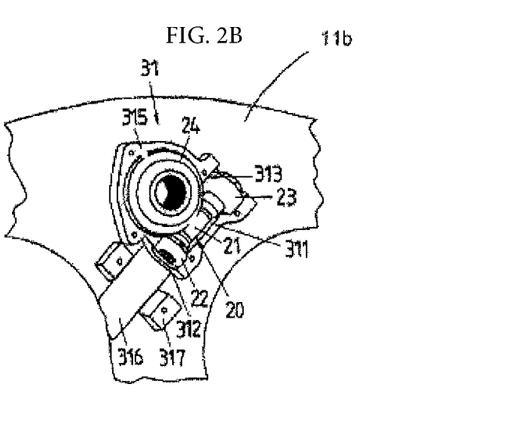
FIG. 2B shows a modified arrangement according to another implementation showing the side of the steering wheel base facing away from the driver.
Figure 3:
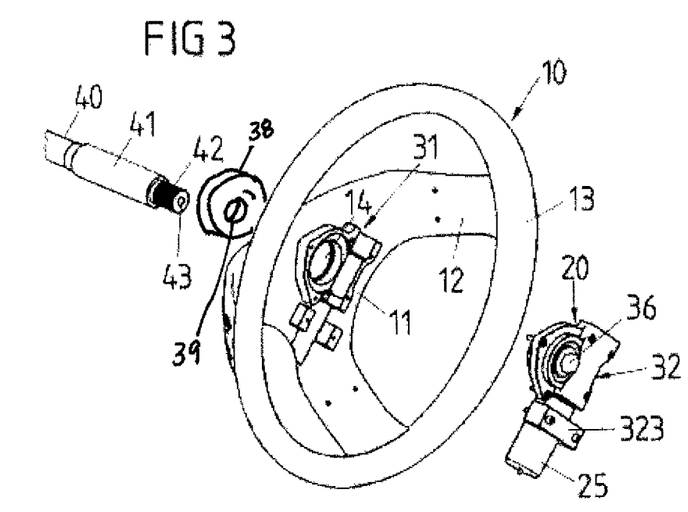
FIG. 3 shows an exploded illustration of a steering device having a steering wheel with the steering wheel base shown in FIG. 1, a steering shaft, and a gearing housing half.
Figure 4:
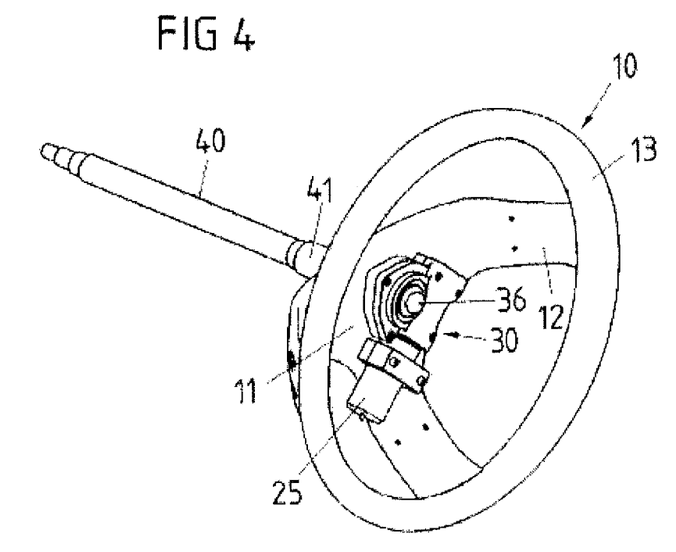
FIG. 4 shows the steering device of FIG. 3 in the assembled state.

FIGS. 3 and 4 show the constituents of the steering device in an exploded illustration and in the assembled state. The steering device comprises a steering wheel 10, a superposition gearing 20 which is arranged in a gearing housing 30, a drive motor 25, and a steering shaft 40. The gearing housing 30, which is illustrated in FIG. 4 in the assembled state, is composed of two housing halves 31, 32, as per the exploded illustration of FIG. 3. The superposition gearing 20 is not shown in detail in FIGS. 3 and 4, since it is hidden by the gearing housing 30 or parts thereof, but is illustrated in FIGS. 1 and 2A-2B.

The steering shaft 40 has, at its end facing toward the steering wheel 10, a steering wheel pin 41 with an external toothing 42 and with a central bore 43 which is provided with a thread. Said steering wheel pin 41 is connected, in a manner known per se, to a steering gear (not illustrated). It is also possible for a servo motor of a servo steering system to additionally be coupled to the steering shaft 40.

It is pointed out that the steering shaft 40 need not necessarily be formed as a cylindrical element. Within the context of the present description, the steering shaft refers to any element which transmits a rotary movement of the superposition gearing or of the steering wheel to a steering gear. It is also pointed out that the steering shaft 40 can be radially and/or axially mounted by means of bearing elements (not illustrated).

The steering wheel 10 is composed of a steering wheel rim 13, a plurality of spokes 12 and a steering wheel base 11. The number and shape of the spokes 12 is to be understood merely as an example. The steering wheel base 11 serves, in interaction with the superposition gearing, for fastening and coupling the steering wheel to the steering shaft 40. For this purpose, the steering wheel base 11 has a central opening 14 through which the steering wheel pin 41 with the external toothing 42 projects, wherein the external toothing 42 engages, in the assembled state, with a drive-output-side gearing element of the superposition gearing, as will be explained in more detail.

It is pointed out that the steering wheel base 11 is also referred to as the steering wheel hub. Said steering wheel base 11—aside from the integration of constituents of the gearing housing, which will be explained in more detail—is formed substantially as a disk which forms the central opening 14. At its edge region, at the transition points to the spokes 12, the steering wheel base 11 is of curved design, such that a continuous transition to the spokes 12 is provided in the illustrated exemplary implementation. Other implementations of the steering wheel base and other transitions to the spokes are however also possible.

As already mentioned, the superposition gearing 20 is illustrated in FIGS. 1 and 2A-2B. Said superposition gearing 20 is formed, as in the illustrated implementation variant, as a worm gear mechanism with a drive worm 21 and a worm gear 24. The drive worm 21 is mounted radially, and also axially in one implementation, by two bearings 22, 23. The drive worm 21 is driven by the electric drive motor 25 (cf. FIGS. 3, 4). The worm gear 24 has an external toothing 241 which meshes with the drive worm 21. The worm gear 24 additionally has a central opening 242 which is provided with an internal toothing, which opening 242, in the assembled state, meshes with the external toothing 42 of the steering shaft 40 and can transmit a torque to the latter. Alternatively, it is also possible for a sleeve which is provided with an internal toothing to be provided for transmitting torque, which sleeve is pressed into the worm gear 24.

The worm gear mechanism 20 is arranged in the gearing housing 30 and the latter is connected to the steering wheel base 11. Here, in the present exemplary implementation, the gearing housing 30 forms two housing halves 31, 32. One of the housing halves 31 is formed by the steering wheel base 11, as can be seen in particular from FIGS. 1 and 2.

The steering wheel base 11 thus forms structures which serve for mounting and fixing the gearing elements of the worm gear mechanism 20 and of the drive motor 25. In particular, in the illustrated exemplary implementation, the following structures are integrated into the steering wheel base 11:
 a partially cylindrical holding region 311 for holding the drive worm 21;
 a first bearing receptacle 312 for holding the bearing 22 of the drive worm 21;
 a second bearing receptacle 313 for holding the second bearing 23 of the drive worm;
 a circular region 314 for holding and mounting the worm gear 24;
 a flange-like region 315 which serves for fastening the other housing shell 32;
 a partially cylindrical holding region 316 for holding the drive motor 25; and
 a holding flange 317 for fastening the drive motor 25 on the housing.

The integration of the structures into the steering wheel 10 takes place for example during the production of the steering wheel skeleton. The integrated structures are raised in relation to the steering wheel base itself.

In FIG. 2A, the drive worm 21 and the worm gear 24 are inserted into the corresponding constituents, which are formed by the steering wheel base 11, of the gearing housing.

It is pointed out that the integration of constituents of the gearing housing into the steering wheel base 11 in FIGS. 1 and 2A is to be understood merely as an example. It is possible for other differently-shaped and differently-arranged constituents of a gearing housing to be integrated into the steering wheel base 11. For example, it is conceivable for only one bearing receptacle for a drive worm or a worm gear or other gearing elements to be provided, without the steering wheel base forming a complete housing half which, together with a further housing half, forms a closed gearing housing. The design of the steering wheel base to form a complete housing half is merely one exemplary implementation.

After the fastening of the gearing elements 21, 24 and of the drive motor 25, the upper housing half 32 is placed onto the lower housing half 31 which is formed by the steering wheel base 11. Here, it is possible on the one hand for the gearing elements 21, 24 and/or the drive motor 25 to firstly be mounted in the housing half 31 formed by the steering wheel base 11, and for the other housing half 32 to subsequently be placed on. It is likewise conceivable for the gearing elements 21,24 and/or the drive motor 25 to be pre-mounted in the other housing half 32 and for the latter to then be placed onto the housing half 31 which is integrated into the steering wheel base 11.

Here, the upper housing half 32 forms structures which correspond to the structures, in particular the bearing receptacles 312, 313, holding regions 311, 316, fastening regions 315 and holding flanges 317, of the housing half 31 which is integrated into the steering wheel base 11. For example, the upper housing half 32 forms a bearing receptacle which corresponds to the bearing receptacle 312 of the housing half 31 and which, overall, form a cylindrical bearing receptacle for the bearing 22 of the drive worm 21. Likewise provided is a further holding flange 323 which, together with the holding flange 317, serves for fastening the drive motor 25 to the steering wheel base or to the gearing housing.

Furthermore, in FIGS. 3 and 4, a screw 36 is provided which, in the fully-assembled state, is screwed into the opening 43 of the steering shaft 40 and fixes the steering shaft 40 on the one hand and the gearing housing 30 and the steering wheel 10 on the other hand to one another. The clock spring 38 is coupled adjacent a back side of the steering wheel 10 and defines a central opening 39 through which pin 41 extends.

FIG. 4 shows the fully-assembled steering device. The gearing housing 30 is rotationally fixedly connected, on account of its partial integration into the steering wheel base 11, to the steering wheel 10. A steering movement by a driver is therefore transmitted, in the same way as a steering movement provided by the superposition gearing 20, via the worm gear 24 to the steering shaft 40. A steering movement by a driver and an associated rotation of the steering wheel base 11 and of the gearing housing 30 which is partially integrated therein thus leads to a rotation of the drive worm 21 about a steering axis which is identical to the longitudinal axis of the steering shaft 40, which rotation leads in turn to a rotation of the worm gear 24 about the steering axis and therefore to a transmission of the steering movement to the steering shaft 40. Likewise, an adjusting movement provided by means of the drive motor 25 is transmitted via the drive worm 21, which rotates about its longitudinal axis, and the worm gear 24 to the steering shaft 40. This is enabled by means of the steering wheel 10 being mounted on the steering shaft 40 in such a way that the two parts can rotate relative to one another, such that an adjusting movement provided by means of the drive motor 25 does not lead to a corresponding rotation of the steering wheel. A corresponding bearing arrangement is described in WO 2007/009420 A1.

The driver inputs a steering angle. This steering angle input by the driver can have a further angle superposed on it by means of the superposition gearing 20. Here, the steering performed by means of the superposition gearing 20 can supplement or else entirely replace the manual steering by a driver. The drive motor 25 is controlled in a suitable manner by a drive motor controller 26, which receives input signals from one or more sensors.

In one modification of the exemplary implementation illustrated in FIGS. 1 to 4, constituents of the gearing housing are integrated into the steering wheel base, rather than on the base side 11a facing the driver, or on that side 11b which faces away from the driver, as shown in FIGS. 2A and 2B, respectively. A further housing half is then likewise placed onto the steering wheel base on that side which faces away from the driver. The engagement of the drive-output-side gearing element with the toothing of the steering shaft takes place in this case likewise on that side of the steering wheel base which faces away from the driver. The design of the gearing housing and of the superposition gearing can otherwise take place in a corresponding way.

Figure 5:
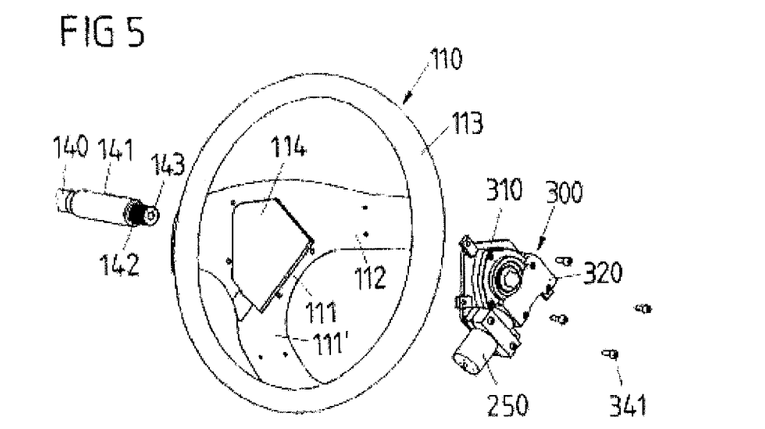
FIG. 5 shows, in an exploded illustration, an exemplary implementation of a steering device having a steering wheel base provided with an opening and having a gearing housing for closing off said opening.
Figure 6:
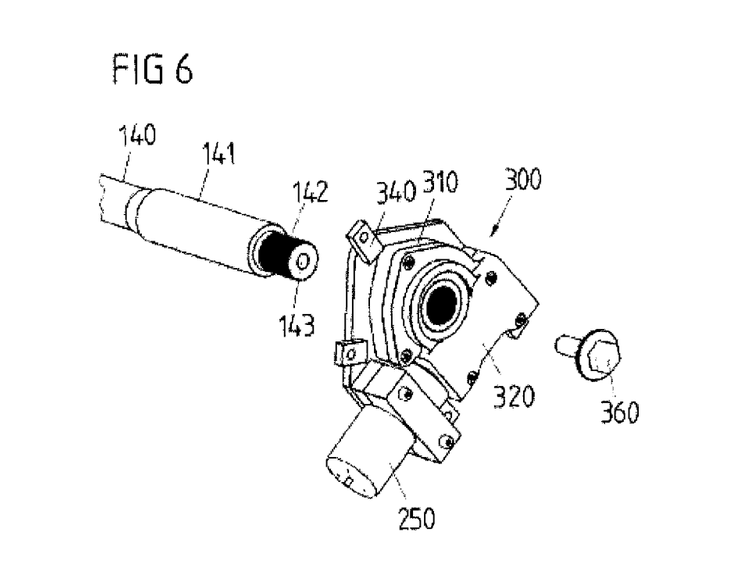
FIG. 6 shows the steering shaft and the gearing housing from FIG. 5 in an enlarged illustration.
Figure 7:
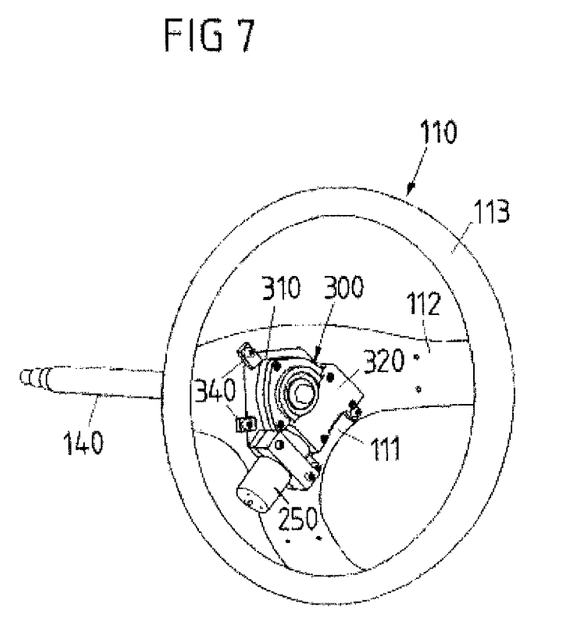
FIG. 7 shows the steering device from FIG. 5 in the assembled state.

FIGS. 5 to 7 illustrate a second exemplary implementation of the invention. Provided once again are a steering device having a steering shaft 140, a steering wheel 110 and a superposition gearing which is arranged in a gearing housing 300. The steering shaft 140 again has a steering wheel pin 141 with an external toothing 142 and with a central bore 143. The steering wheel 110 again has a steering wheel rim 113, spokes 112 and a steering wheel base 111. The superposition gearing is again formed by a worm gear mechanism having a drive worm, which is driven by a drive motor 250, and a worm gear. In this respect, reference is made to the statements made with regard to FIGS. 1 to 4.

In contrast to the exemplary implementation of FIGS. 1 to 4, a large-area cutout or opening 114 is located in the steering wheel base 111 in the central region which serves for holding and coupling the steering shaft 140. The gearing housing 300 is inserted into said opening 114, as a result of which the opening 114 is closed off.

Here, the superposition gearing and the gearing housing 300 can for example be formed corresponding to the implementation of FIGS. 1 to 4. Here, the gearing housing 300 is composed of two housing halves 310, 320, with the elements which are integrated into the steering wheel base in the implementation of FIGS. 1 to 4 being integrated into a separate housing half 310 which is connected to the other housing half 320 to form the gearing housing 300. Alternatively, the gearing housing can however be formed from a different number of components or differently-formed components.

In the illustrated design of the gearing housing 300 composed of two housing halves 310, 320, the opening 114 is closed off by the lower housing half 310.

As can be seen in particular from FIG. 6, the lower gearing housing half 310 forms, at its side which faces toward the steering wheel base 111, fastening elements in the form of laterally projecting webs 340 with passage holes, which serve for fastening the gearing housing to an edge region 111' of the steering wheel base 111 for example by means of screws 341. It is of course also possible to provide some other form of connection instead of a screw connection. By means of the edge region 111', the steering wheel base 111 is also connected to the spokes 112 of the steering wheel 110.

FIG. 6 also illustrates a screw 360 which, in the fully assembled state, is screwed into the central opening 143 of the steering shaft 140 and fixes the steering shaft 140 on the one hand and the gearing housing 300 and the steering wheel 110 on the other hand to one another.

FIG. 7 shows the fully assembled steering device. In the implementation of FIGS. 5 to 7, the gearing housing 300 therefore forms a part of the steering wheel base 111 and takes over the function of the latter. Here, the gearing housing 300 forms a receptacle for coupling the steering shaft 140, wherein in the assembled state, the external toothing 142 of the steering shaft 140 is in engagement with the internal toothing of the worm gear of the superposition gearing or with some other drive-output-side gearing element.

In a modification of the exemplary implementation of FIGS. 5 to 7, a steering wheel base is dispensed with entirely. In this design, the gearing housing is connected directly to the spokes of the steering wheel.

In a further modification of the exemplary implementation of FIGS. 5 to 7, the gearing housing, the superposition gearing and the drive motor are arranged on that side of the steering wheel base which faces away from the driver. Fastening elements corresponding to the webs 340 of FIGS. 5 to 7 are then arranged on that housing half of the gearing housing which faces toward the driver.

Figure 8:
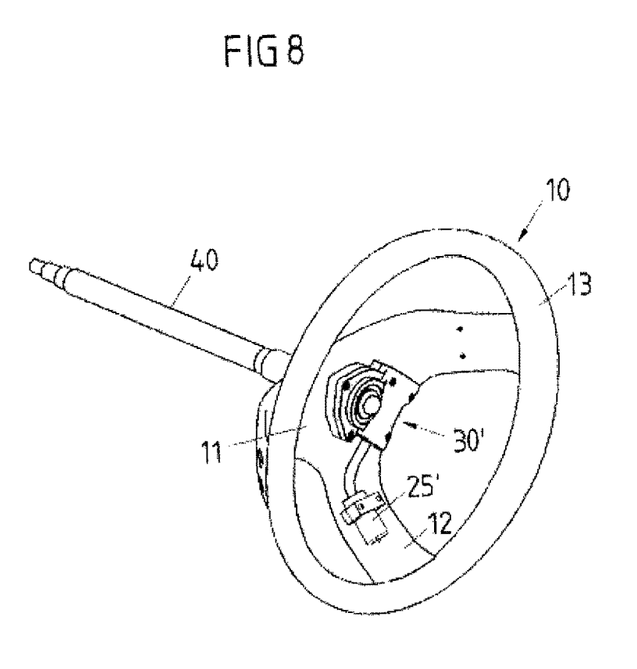
FIG. 8 shows a steering device in which the drive motor is arranged spatially separate from the gearing housing on the steering wheel.

FIG. 8 shows a steering device in which, in contrast to FIGS. 1 to 7 in which the drive motor is arranged together with the gearing elements in or on the gearing housing, the drive motor 25' is arranged spatially separate from the gearing housing 30' on the steering wheel. This can be advantageous for space reasons in the event of limited installation space being available. The drive motor 25' is for example accommodated, by way of suitable fastening means, in the region of a spoke 12 corresponding to FIG. 8. In such a case, the rotational axes of the drive motor 25' and of the drive worm or of some other input-side gearing element of the superposition gearing will generally not run coaxially. Rigid connections are therefore not possible for transmitting torques. In fact, a connection between the drive motor 25' and the gearing is provided which compensates the axial offset, for example using a flexible shaft, a flexible coupling or an articulated shaft.

The spatially separate arrangement of the drive motor can be realized both in the exemplary implementation of FIGS. 1 to 4 and also in the exemplary implementation of FIGS. 5 to 7. In connection with the exemplary implementation of FIGS. 1 to 4, it is provided then that those constituents of the gearing housing which are integrated into the steering wheel base do not relate to the mounting or fixing of the drive motor.

An active steering system, such as the active steering systems described above in relation to FIGS. 1 through 8, may be used to detect operator contact with the steering wheel, according to various implementations. For example, a drive motor controller, such as drive motor controller 26 shown in FIG. 4, is in electrical communication with the drive motor, such as drive motors 25, 250, 25' shown in FIGS. 1 through 8 above, to control the operation of the drive motor. To detect operator contact with the steering wheel, the drive motor controller generates a drive signal to the drive motor to apply a force to the steering wheel 10 and measures a current generated from a back electromotive force (back-EMF) on the drive motor resulting from the operator's reaction to the test force applied by the drive motor. In certain implementations, the force is a test force applied specifically to detect contact with the steering wheel. For example, the test force applied by the drive motor may be less than about 0.1 Nm. With a 1:48 gear ratio to the driver, such a test force would be less than around 4.8 Nm to the driver. The force may also include the force applied to assist with steering. The force may be applied at a certain frequency. For example, the frequency may be between every 10 to 100 milliseconds.

The drive motor controller associates the back-EMF on the drive motor with a current value. Then, the drive motor controller compares the current value with a predefined current range and determines, from the comparison, whether there is contact between the operator and the steering wheel. The predefined current range can be, for example, a current value from and including about 1 amp to and including about 4 amps. The predefined current range may change depending on the test force applied, according to some implementations.

The determination of operator contact with the steering wheel, e.g., whether the operator's hands are or are not on the wheel, can be electronically communicated from the drive motor controller to an autonomous driving system, cruise control system, safety system, and/or other vehicle systems. At least one action can be taken as a result of the determination. For example, an alert may be sent to the operator of the vehicle. The alert can be an audio and/or video signal that is displayed to the operator. The alert can additionally (or alternatively) be a vibrational signal that is mechanically imparted and receivable by the operator's body. The controller may also send a message to one or more other vehicle systems to alert the operator in the manner previously described.

In certain implementations, the drive motor controller can control the operation of the drive motor by regulating power to the drive motor. In particular, the drive motor controller can apply at least one pulse of electric current to the drive motor, according to some implementations. For example, a square wave of current can be applied. The drive motor controller can then measure the generated current periodically. The period for measuring the generated current may be, for example, anytime from approximately one one-hundredths of a millisecond to approximately one millisecond.

In addition, the magnitude of the test force generated by the drive motor controller may be altered depending on the velocity of the vehicle, according to some implementations. The velocity of the vehicle can be defined as both the linear speed of the vehicle and the direction that that vehicle is moving. The velocity can further comprise an instantaneous velocity, since the velocity can change from instant to instant. For example, if the velocity of the vehicle is greater than a predefined velocity threshold value, the drive motor controller can, for example, reduce the magnitude of the test force applied to the steering wheel. If the velocity of the vehicle is less than the predefined velocity threshold value, the drive motor controller can, for example, increase the magnitude of the test force applied to the steering wheel. Other situational factors, however, may reverse the relative magnitude of these applied test forces.

For example, multiple set points based on speed may be calibrated for various vehicle velocities. The system applies an overlay angle based on the speed the vehicle is currently traveling. For example, set points may be include 0, 5, 12, 20, 40, 60, 80, and 100 kph. The overlay angle is increased up until around 20 kph, then it starts to slowly scale down from there. Once the vehicle achieves highway speeds, the system is basically no longer applying any overlay angle, and in some situations, am overlay angle may be subtracted.

The velocity, or speed and direction, of the vehicle can be measured by one or more sensors. The sensors can measure the angle of one or more wheels (e.g., front or rear, or other, in the case of multiple axel vehicles), with respect to the vector that points in the direction that the vehicle is moving. The sensors can distinguish, for example, whether the vehicle is changing lanes, making a slight turn, making a full turn, making a U-turn, or even a turn associated with parallel parking. Moreover, the acceleration of the vehicle can be inferred from the measurement of the velocity, or it can be measured independently.

Similarly, the angular velocity of the steering wheel may be used by the drive motor controller to adjust the magnitude of the test force applied by the drive motor controller. For example, if the steering wheel is rotating with an angular velocity greater than a predefined angular velocity threshold value, the drive motor controller can, for example, increase the magnitude of the test force applied to the steering wheel. If the steering wheel is rotating with an angular velocity less than the predefined angular velocity threshold value, the drive motor controller can, for example, decrease the magnitude of test force applied to the steering wheel. Other situational factors, however, may reverse the relative magnitude of these applied forces. In one aspect, the angular velocity threshold can be about 1000 radians/second or less. Moreover, in some implementations, the velocity, acceleration, and/or angular velocity thresholds may be used in combination with each other to determine the magnitude of the test force. For example, the angular velocity threshold may be lower in the case of a lane change on the highway when the vehicle is traveling at a high speed (e.g., at or over 60 mph). The angular velocity threshold of the steering wheel may be higher, for example, when the operator is attempting to parallel-park the vehicle. In addition or alternatively, the drive motor controller may be configured to apply the test force when the angular velocity is below a certain high angular velocity threshold value (e.g., about 500 deg/sec) based on an assumption that the driver has control when the angular velocity exceeds the high angular velocity threshold value.

In various implementations, the system can use one or more of the following parameters to select the magnitude of the test force used to detect operator contact with the steering wheel and/or to provide assistive force to the operator steering: a vehicle velocity, a vehicle acceleration, an angular velocity of the steering wheel, a yaw rate of the vehicle, a toe angle of the vehicle, a camber angle of the vehicle, a caster angle of the vehicle, the angle of any one of the wheels of the vehicle, the weight of the vehicle including the weight of the passengers and/or cargo, windows/sun-roof/convertible-roof open/close status, external road environment (e.g., road surface material, road surface structural condition, presence of snow/rain/ice, road geometry (e.g., incline, number of lanes, type of lanes (e.g. passing/no-passing, approaching, turn lane)), surrounding obstacles (e.g. permanent—bridges, tunnels, buttresses, surrounding or approaching traffic (e.g. volume, proximity, relative dynamics)), and/or internal cockpit environment (e.g., driver state (e.g. identity, age, capability, health, impairment type/level, alertness), number of occupants and occupant states).

Figure 9:
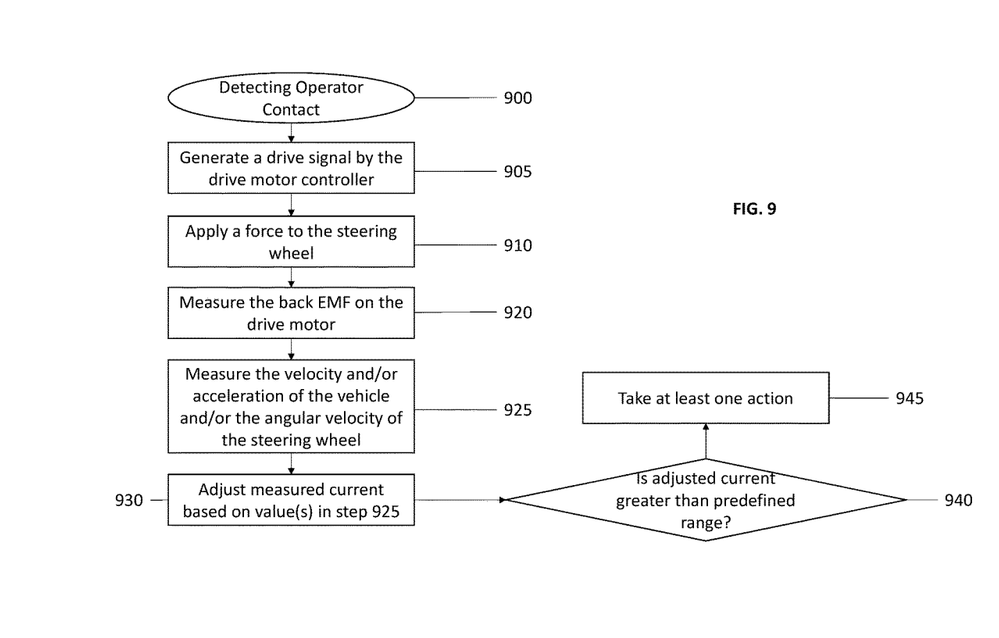
FIG. 9 shows a flow chart diagram illustrating an exemplary process of detecting contact with the steering wheel.

FIG. 9 shows a flow chart diagram illustrating an exemplary process 900 of detecting operator contact with the steering wheel using the above described system. Process 900 begins by generating a drive signal by the drive motor controller in block 905. The signal by the drive motor controller is then used in block 910 to apply a test force to the steering wheel through the drive motor. In block 920, the back-EMF on the drive motor is received by the drive motor controller, measured, and associated with a current value by the drive motor controller. In block 925, the velocity and/or acceleration of the vehicle and/or the angular velocity of the steering wheel are measured. And, in block 930, one or more of the values from step 925 are used to adjust the measured current from step 920. For example, as the measured angular velocity increases, the measured current is increased. In blocks 940, the adjusted current value is compared to the predefined current range. If the current value is greater than the predefined current range, at least one action is taken in block 945. Additional vehicle and environmental data and information can be collected from other vehicle systems as well.

In one aspect the back-EMF can also be referred to as the counter-electromotive force (counter EMF, or CEMF). It can refer to a voltage, or electromotive force, that pushes against the current which induces it. The back-EMF can refer to a voltage drop in an alternating current (AC) circuit caused by magnetic induction. The voltage's polarity can at every moment, be the reverse of the input voltage. For example, the drive motor speed and position can be measured because the back-EMF can be proportional to the armature rotational speed of drive motor.

Reading the rotational velocity from the drive motor using back-EMF can involve two alternating steps. First, the drive motor can be run for some period of time by providing current to the windings (e.g., by the drive motor controller). This current can be supplied, for example, as a constant voltage or a pulse width modulated (PWM) drive motor input. The latter can allow for the drive motor speed to be varied. The second step can be to remove the driving voltage and electrically float the windings of the drive motor. Electrically floating can refer to the situation where there is no active circuit between the windings and any other source/sink. A circuit capable of measuring the voltage across the windings can then be connected or activated. The inertia in the drive motor and mechanical system can cause the drive motor to continue to spin long enough to measure the voltage produced by the drive motor. Typically these steps can be alternated at a given frequency, for example, at once from every approximately 1 to approximately 200 milliseconds. In one aspect of the disclosure, the steps can be run once every approximately 1 millisecond to once every approximately 100 milliseconds.

The time required for the drive motor to flip from a motor to a generator state can depend on the inherent capacitance and stored charge in the inductance of the drive motor windings. This time can typically be on the order of milliseconds (approximately 1 to approximately 100 milliseconds), and can depend on many conditions and characteristics of the drive motor.

In some implementations, the circuit can be used to handle possibly large voltages from the drive motor and convert them into a voltage range in accordance with the specifications of an analog to digital converter. The circuit can also tolerate large inductive voltage spikes. Furthermore, the voltage across the drive motor windings can invert when the drive motor direction changes, so the circuit can adjust the voltage polarity and range and create an input offset so that the neutral, not spinning, voltage output of the measurement circuit centers around a known value.

Various methods may be used to measure the voltage in a back-EMF circuit, involving different drive motor, direction and voltage combinations. In one implementation, the measurement can be passive so it does not affect the drive motor. The measurement can be executed when the circuit is not active. In addition, the measurement can be fast enough with respect to the speed of the other components of the system so that the motor can spend most of the time supplying mechanical force to the system.

The disclosure is not restricted in terms of its design to the above-illustrated exemplary implementations; these are to be understood merely as examples. It can for example be provided that the steering wheel base is shaped in some other way, integrates at least one constituent of a gearing housing in some other way, or has some other shape of cutout for holding a gearing housing. The design of the steering shaft, of the steering wheel including the spokes and of the superposition gearing in the form of a worm gear mechanism are also be understood merely as examples. Finally, the gearing housing can also be formed in some other way, for example can be composed of more than two components and/or perform only bearing functions without providing a closed housing.

As will be appreciated by one skilled in the art, the methods and systems may take the form of an entirely hardware implementation, an entirely software implementation, or an implementation combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

While the methods and systems have been described in connection with preferred implementations and specific examples, it is not intended that the scope be limited to the particular implementations set forth, as the implementations herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of implementations described in the specification.

It will be apparent to those skilled in the art that various modifications and variations can be made without departing from the scope or spirit. Other implementations will be apparent to those skilled in the art from consideration of the specification and practice disclosed herein. It is intended that the specification and examples be considered as exemplary only, with a true scope and spirit being indicated by the following claims.

The invention claimed is:

1. A system for detecting operator contact with a steering wheel of a vehicle, the system comprising:
a steering wheel;
a drive motor coupled to the steering wheel; and
a drive motor controller that controls the operation of the drive motor;
wherein the drive motor controller:
generates and communicates a drive signal to the drive motor to apply a force to the steering wheel,
measures a current generated from a back electromotive force (back-EMF) on the drive motor resulting from the operator's reactions to the force applied by the drive motor,
compares the current with a predefined current range, and
in response to the current being greater than the predefined current range, determines contact between the operator and the steering wheel, and
in response to the current being less than or within the predefined current range, determines a lack of contact between the operator and the steering wheel.

2. The system of claim 1, wherein the steering wheel comprises a steering wheel base, and the drive motor is disposed adjacent the steering wheel base.

3. The system of claim 1, wherein the drive motor is operationally connected to one or more gears that rotate the steering wheel.

4. The system of claim 1, wherein the drive motor controller controls the operation of the drive motor by regulating power to the drive motor.

5. The system of claim 1, wherein the drive motor controller applies the force to the steering wheel through the drive motor and, after measuring the current generated on the drive motor by the back EMF, associates the back-EMF on the drive motor with a respective current value.

6. The system of claim 5, wherein the current range is between 1 amp and 4 amps and wherein the drive motor controller measures the current generated on the drive motor after applying the force to the steering wheel.

7. The system of claim 1, wherein the measuring is performed periodically.

8. The system of claim 7, wherein periodically is one one-hundredths of a millisecond.

9. The system of claim 1 wherein the drive motor is a component of an active steering system.

10. The system of claim 9, wherein the drive motor controller is a component of the active steering system.

11. The system of claim 1, wherein applying a force comprises applying at least one pulse of electric current.

12. The system of claim 1, wherein the drive motor controller communicates the determination to an autonomous driving system, cruise control system, and/or a safety system.

13. The system of claim 12, wherein at least one action is taken as a result of the determination.

14. The system of claim 13, wherein the at least one action comprises sending an alert to the operator of the vehicle.

15. The system of claim 14, wherein the alert comprises a visual signal that is displayed to the operator.

16. The system of claim 14, wherein the alert comprises an audio signal that is broadcast to the operator.

17. The system of claim 14, wherein the alert comprises a vibrational signal that is mechanically imparted and receivable by the operator's body.

18. The system of claim 1, wherein if the velocity of the vehicle is greater than a predefined velocity threshold value, the drive motor controller applies a first force to the steering wheel, and if the velocity of the vehicle is less than the predefined velocity threshold value, the drive motor controller applies a second force to the steering wheel, wherein the first force is less than the second force.

19. The system of claim 1, wherein if the steering wheel is rotating with an angular velocity greater than a predefined angular velocity threshold value, the drive motor controller applies a first force to the steering wheel, and if the angular velocity is less than the predefined angular velocity threshold value, the drive motor controller applies a second force to the steering wheel, wherein the first force is greater than the second force.

20. The system of claim 1, wherein the drive motor is disposed adjacent to a clock spring housing of the steering wheel.

21. The system of claim 1, wherein the drive motor controller receives a velocity and/or an acceleration of the vehicle and/or an angular velocity of the steering wheel, adjusts the measured current based on the receive velocity, acceleration, and/or angular velocity, and compares the adjusted current with the predefined current range.

22. A method for detecting operator contact with a steering wheel of a vehicle, the method comprising:
generating and communicating a drive signal, by a drive motor controller, to a drive motor to apply a force to a steering wheel, wherein the drive motor is coupled to the steering wheel, and the drive motor controller controls the operation of the drive motor,
measuring a current generated from a back electromotive force (back-EMF) on the drive motor resulting from the operator's reactions to the force applied by the drive motor,
comparing, by the drive motor controller, the current with a predefined current range,
in response to the current being greater than the predefined range, determining contact between the operator and the steering wheel, and
in response to the current being less than or within the predefined range, determining a lack of contact between the operator and the steering wheel.

23. The method of claim 22, wherein the steering wheel comprises a steering wheel base, and the drive motor is disposed adjacent the steering wheel base.

24. The method of claim 22, wherein the drive motor is operationally connected to one or more gears that rotate the steering wheel.

25. The method of claim 22, wherein the drive motor controller controls the operation of the drive motor by regulating power to the drive motor.

26. The method of claim 22, wherein the drive motor controller receives the back-EMF on the drive motor and associates the back-EMF on the drive motor with a current value.

27. The method of claim 26, wherein the current range is between 1 amp and 4 amps and wherein the drive motor controller measures the current generated on the drive motor after applying the force to the steering wheel.

28. The method of claim 22, wherein the measuring is performed periodically.

29. The method of claim 28, wherein periodically is one one-hundredths of a millisecond.

30. The method of claim 22, wherein the drive motor is a component of an active steering system.

31. The method of claim 29, wherein the drive motor controller is a component of the active steering system.

32. The method of claim 22, wherein applying a force comprises applying a pulse of electric current.

33. The method of claim 22, further comprising communicating the determination to an autonomous driving system, cruise control system, and/or a safety system.

34. The method of claim 33, wherein at least one action is taken as a result of the determination.

35. The method of claim 34, wherein the at least one action comprises sending an alert to the operator of the vehicle.

36. The method of claim 35, wherein the alert comprises a visual signal that is displayed to the operator.

37. The method of claim 35, wherein the alert comprises an audio signal that is broadcast to the operator.

38. The method of claim 35, wherein the alert comprises a vibrational signal that is mechanically imparted and receivable by the operator's body.

39. The method of claim 22, wherein if the velocity of the vehicle is greater than a predefined velocity threshold value, the drive motor controller applies a first force to the steering wheel, and if the velocity of the vehicle is less than the predefined velocity threshold value, the drive motor controller applies a second force to the steering wheel, wherein the first force is less than the second force.

40. The method of claim 22, wherein if the steering wheel is rotating with an angular velocity greater than a predefined angular velocity threshold value, the drive motor controller applies a first force to the steering wheel, and if the angular velocity is less than the predefined angular velocity threshold value, the drive motor controller applies a second force to the steering wheel, wherein the first force is greater than the second force.

41. The method of claim 22, wherein the drive motor is disposed adjacent to a clock spring housing of the steering wheel.

* * * * *